(12) United States Patent
Grünewald et al.

(10) Patent No.: US 12,516,879 B2
(45) Date of Patent: Jan. 6, 2026

(54) DEVICE AND METHOD FOR DRYING DIALYSIS FILTERS

(71) Applicant: Zahoransky Automation & Molds GmbH, Freiburg (DE)

(72) Inventors: Lüdger Grünewald, Karben (DE); Berthold Schopferer, Teningen (DE)

(73) Assignee: Zahoransky Automation & Molds GmbH, Freiburg (DE)

( * ) Notice: Subject to any disclaimer, the term of this patent is extended or adjusted under 35 U.S.C. 154(b) by 408 days.

(21) Appl. No.: 17/801,860

(22) PCT Filed: Feb. 25, 2021

(86) PCT No.: PCT/EP2021/054700
§ 371 (c)(1),
(2) Date: Aug. 24, 2022

(87) PCT Pub. No.: WO2021/170726
PCT Pub. Date: Sep. 2, 2021

(65) Prior Publication Data
US 2023/0091902 A1    Mar. 23, 2023

(30) Foreign Application Priority Data
Feb. 28, 2020 (DE) .......... 102020105340.1

(51) Int. Cl.
| F26B 3/347 | (2006.01) |
| F26B 9/06 | (2006.01) |
| F26B 21/00 | (2006.01) |
| F26B 25/22 | (2006.01) |

(52) U.S. Cl.
CPC ............... F26B 3/347 (2013.01); F26B 9/06 (2013.01); F26B 21/006 (2013.01); F26B 25/22 (2013.01)

(58) Field of Classification Search
CPC .......... F26B 5/347; F26B 9/06; F26B 21/006; F26B 25/22
USPC .......................................... 34/259
See application file for complete search history.

(56) References Cited

U.S. PATENT DOCUMENTS

| 5,661,913 | A * | 9/1997 | Kato ................. H01L 21/67028 34/406 |
| 7,181,863 | B2 * | 2/2007 | Ferrell .............. H01L 21/67034 34/340 |
| 7,201,572 | B2 * | 4/2007 | Wood .................... C04B 35/632 428/210 |
| 7,353,623 | B2 * | 4/2008 | Asuke ..................... F26B 21/12 34/80 |
| 8,701,307 | B2 * | 4/2014 | Slack ........................ F28G 9/00 165/95 |
| 9,585,419 | B2 * | 3/2017 | Stromotich ............. A23B 7/01 |

(Continued)

FOREIGN PATENT DOCUMENTS

| CN | 104165507 A | 11/2014 |
| CN | 110094944 | 8/2019 |

(Continued)

*Primary Examiner* — Stephen M Gravini
(74) *Attorney, Agent, or Firm* — Volpe Koenig

(57) ABSTRACT

A device (1) and a method for drying dialysis filters are provided. The device (1) has a drying chamber (2) and a microwave generating unit (3), which emits microwaves into the drying chamber (2). This allows effectuate rapid drying cost-effectively. The microwave generating unit (3) has a variable frequency and/or a variable power.

9 Claims, 3 Drawing Sheets

(56) References Cited

U.S. PATENT DOCUMENTS

| | | | |
|---|---|---|---|
| 11,143,454 B2* | 10/2021 | Triglia, Jr. | F26B 3/347 |
| 11,293,692 B2* | 4/2022 | Ulrich | F26B 3/347 |
| 12,044,474 B1* | 7/2024 | Troxler | F26B 3/347 |
| 12,146,709 B2* | 11/2024 | Reuter | F26B 5/06 |
| 2007/0114167 A1 | 5/2007 | Mabuchi et al. | |
| 2022/0144680 A1* | 5/2022 | Heindl | F26B 25/22 |
| 2023/0091902 A1* | 3/2023 | Grünewald | F26B 9/06 |
| 2024/0035747 A1* | 2/2024 | Mallah | B01D 67/0095 |

FOREIGN PATENT DOCUMENTS

| | | | | |
|---|---|---|---|---|
| CN | 209265301 U | | 8/2019 | |
| CN | 104364646 B | | 6/2020 | |
| CN | 115176119 A | * | 10/2022 | F26B 21/006 |
| CN | 116472433 A | * | 7/2023 | B01D 67/0095 |
| CN | 110094944 B | | 2/2024 | |
| DE | 29802402 | | 5/1998 | |
| DE | 102006023198 | | 11/2007 | |
| DE | 102020105340 B3 | * | 4/2021 | F26B 21/006 |
| DE | 102020129822 A1 | * | 5/2022 | C02F 11/13 |
| EP | 1733784 A1 | * | 12/2006 | B01D 63/02 |
| JP | 2003284931 A | | 10/2003 | |
| JP | 2006167597 A | * | 6/2006 | |
| JP | 4325904 | | 6/2009 | |
| WO | 2018094523 | | 5/2018 | |
| WO | WO-2021170726 A1 | * | 9/2021 | F26B 21/006 |
| WO | WO-2022033637 A1 | * | 2/2022 | B01D 67/0095 |

* cited by examiner

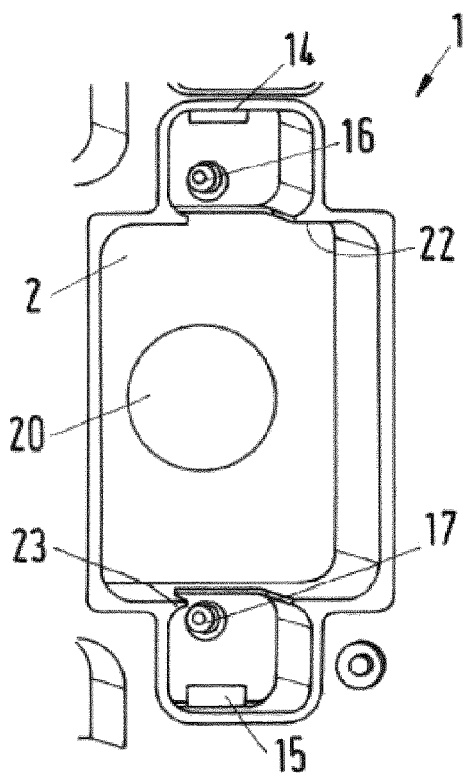
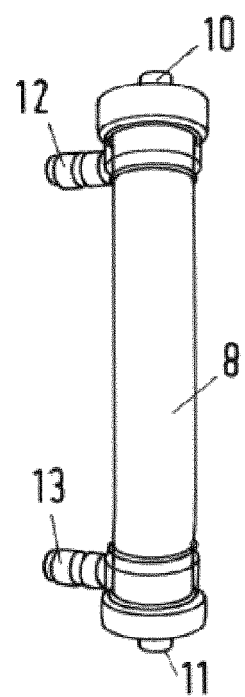
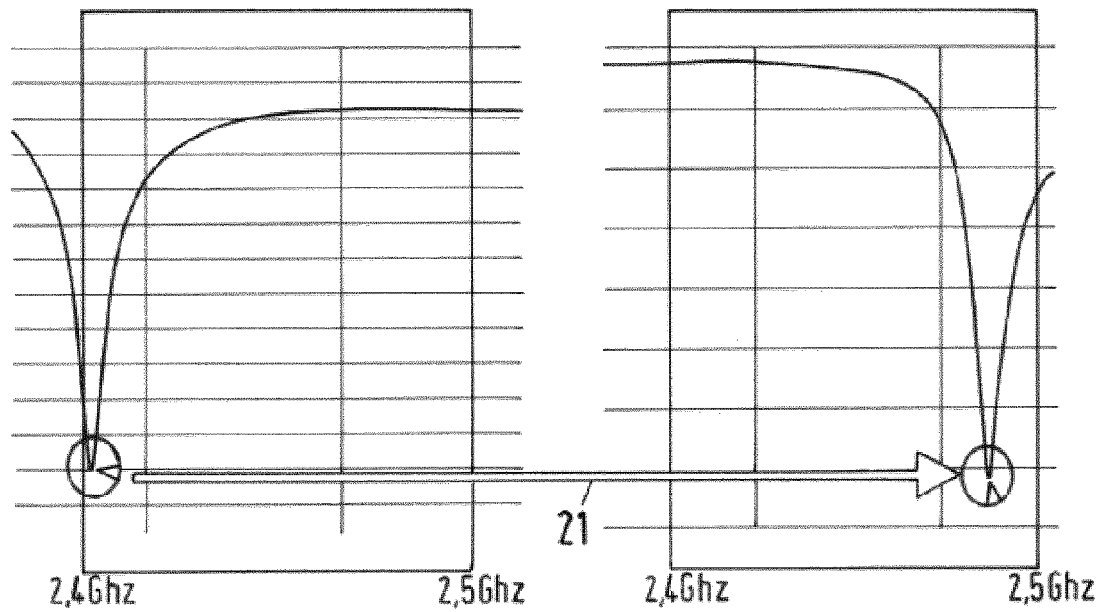
Fig.2
Fig.3
Fig.4

DEVICE AND METHOD FOR DRYING DIALYSIS FILTERS

TECHNICAL FIELD

The present invention relates to a device for drying dialysis filters having a drying chamber and a microwave generating unit, which emits microwaves into the drying chamber.

Furthermore, the invention relates to a method for drying dialysis filters, in which a dialysis filter is introduced into a drying chamber and is subjected therein to microwaves.

BACKGROUND

In the production of dialysis filters, the tightness of fibers in the filter and thus the function of the dialysis filter has to be checked during the production process to ensure the functionality. One known procedure is to fill the fibers in the dialysis filter with demineralized water in order to subsequently subject them to a diffusion test. When the corresponding dialysis filter has passed through the diffusion test positively, the water located in the filter has to be removed again. In other words, the dialysis filter has to be dried.

Having sterile hot air flow through the dialysis filter for drying is known. The water in the filter is to be evaporated and discharged here. One difficulty in this procedure is that the temperature of the hot air is to be as high as possible, on the one hand, but is not to exceed 100° C., on the other hand, to prevent thermal damage to the dialysis filter. In addition, this procedure has a very high energy demand.

Furthermore, heating the water located in the dialysis filter with the aid of microwaves, so that it evaporates and can be discharged, is known. The advantage of this procedure is that only the water in the dialysis filter has to be heated, so that no additional energy for heating further parts is necessary.

It is problematic in this procedure that with increasing drying of the filter, the microwaves act to a stronger extent on other parts of the dialysis filter and can sometimes damage these other parts. Damaged dialysis filters cannot be used and are discards.

SUMMARY

The invention is based on the object of effectuating rapid drying of dialysis filters cost-effectively.

This object is achieved in a device of the type mentioned at the outset which has one or more of the means and features as disclosed herein that are directed to such a device and is achieved in particular in that the microwave generating unit has a variable frequency and/or a variable power.

Using such a device, it is therefore possible to set the frequency of the microwaves accurately to the type and/or the condition of the dialysis filter to be dried. A drier dialysis filter requires, for example, a somewhat higher frequency of the microwaves than a moister dialysis filter.

Due to the variable power of the microwave generating unit, it is furthermore possible to adapt the power of the microwaves as needed and/or to set it accurately to the type and/or the condition of the dialysis filter to be dried. To protect the dialysis filter from damage, it can be expedient, for example, to reduce the power of the microwave generating unit and thus the power of the microwaves with increasing degree of drying of the dialysis filter. Overheating of the dialysis filter during the drying process may thus be avoided.

In one embodiment of the device, the microwave generating unit is configured to keep the frequency constant at variable power. In this way, it is possible to generate microwaves of different power at a constant frequency using the microwave generating unit.

In one embodiment of the device, the microwave generating unit is configured to keep the power constant with variable frequency. In this way, it is possible to generate microwaves of different frequency at a constant power using the microwave generating unit.

The microwave generating unit is preferably connected to a control unit, which changes the frequency and/or the power of the microwave generating unit during a drying process. The control unit can be configured to keep the frequency and/or the power of the microwave generating unit constant during a drying process. During a drying process, the moisture of the dialysis filter decreases. The control unit can then increase the frequency of the microwaves during the drying process to be able to use the suitable frequency of the microwaves for each section of the drying process. The change of the frequency of the microwaves can take place in steps or continuously. The control unit can execute a predetermined program, for example. The drying curve of a dialysis filter can be found out by experiments or calculations and the frequency of the microwaves can be adapted to this drying curve.

During a drying process, the moisture of the dialysis filter decreases. The control unit can then increase the power of the microwave generating unit and thus the power of the microwaves during the drying process to be able to provide the suitable power of the microwaves for each section of the drying process. The change of the power of the microwaves can take place in steps or continuously. The control unit can execute a predetermined program, for example. The drying curve of a dialysis filter can be found out by experiments or calculations and the power or the power curve of the microwave generating unit and thus the microwaves can be adapted to this drying curve.

It is also advantageous if the control unit is connected to at least one moisture sensor and the frequency and/or the power of the microwave generating unit changes as a function of a moisture value ascertained by the moisture sensor.

The moisture sensor is advantageously arranged in an air flow path. The moisture sensor can ascertain, for example, the moisture of the air in the drying chamber or the air in an air flow which is applied to the dialysis filter. This moisture value is then an indirect measure of the moisture of the dialysis filter.

In one embodiment of the device, it is provided that at least one moisture sensor is arranged in a supply air flow into the drying chamber, in particular in a supply air line into the drying chamber. Furthermore, it is possible to arrange at least one moisture sensor in an exhaust air flow out of the drying chamber, in particular in an exhaust air line out of the drying chamber. If at least one moisture sensor is arranged both in the supply air flow and also in the exhaust air flow, the drying curve and/or the degree of drying of a dialysis filter arranged in the drying chamber can be determined and/or monitored on the basis of a difference of the moisture values ascertained using the at least two moisture sensors.

The microwave generating unit is preferably designed as a semiconductor assembly. The microwaves are thus generated by semiconductor components. This has the advantage that targeted microwaves can be generated. These are controllable in frequency and power.

In one embodiment of the device, the microwave generating unit has at least one microwave source. In particular at least one microwave generator, for example, at least one magnetron and/or at least one semiconductor source, can be provided as the microwave source. The microwave generating unit can have at least one antenna for emitting microwaves. All of the mentioned functional units can preferably be based on semiconductor technology.

The energy introduction or the energy supply can take place in precise patterns and the amount of energy reflected in the drying chamber can be monitored. The drying can thus be exactly controlled. The wavelength of the microwaves which results from the frequency can be adapted to the required wavelength for drying the dialysis filter, for example, in that the frequency is adapted. The power can also be reduced with increasing drying. Algorithms can thus be used which monitor the moisture or the energy introduction via the feedback of the reflected power and adapt the wavelengths and/or the power to the changing moisture of the drying dialysis filter. In this way, the maximum possible amount of energy for drying the dialysis filter is always introduced, thus excessive energy supply is prevented. A short drying time is thus achieved with low energy introduction at the same time. Moreover, the risk of an energy introduction into other parts of the dialysis filter and thus the destruction of the dialysis filter is minimized. A further advantage of generating microwaves with the aid of semiconductor components is in the mechanical structure which is necessary for generating the microwaves. Bulky components, such as a transformer, and rotating drives are dispensed with. Semiconductor technology moreover typically has a relatively long service life.

The drying chamber preferably has a connector arrangement which is connected to an air flow generating unit. A dialysis filter typically has two pairs of fittings, which are referred to as the "Hansen" fitting and "Luer" fitting. Air can now be conducted through one or both pairs of fittings to discharge the moisture evaporated during the drying. The above-mentioned moisture sensor can then, as mentioned, be arranged in the air flow, for example. In some cases, the dialysis filter can also already be dried when the caps in which the Luer fittings are arranged are not yet installed. In this case, a larger cross section is available for the air flow, so that in otherwise identical conditions, a greater volume flow of air can be conducted through the dialysis filter, which shortens the drying time.

In one embodiment of the device, it has an air dryer. With the aid of the air dryer, it is possible to dry air before it is conducted into the drying chamber to dry the dialysis filter. Furthermore, the device can have a sterilizing unit for air sterilization. With the aid of the sterilizing unit, the device can sterilize air for drying dialysis filters. The use of sterile air for drying dialysis filters is advantageous to avoid contamination of the dialysis filters. It is possible to dispense with keeping ready sterile air for operating the device due to the sterilizing unit of the device. The air dryer and/or the air sterilizing unit can be part of an air flow generating unit of the device.

The device can have at least one microwave sensor for detecting microwaves which are unused and/or reflected in the drying chamber and/or non-absorbed microwaves. At least one microwave sensor can be arranged, for example, in the drying chamber. The at least one microwave sensor can be connected to the above-mentioned control unit of the device. It is thus possible to take into consideration a sensor signal of the microwave sensor in the regulation/control of the microwave generating unit. In this way, a frequency and/or a power of the microwave generating unit and thus of the microwaves can be adapted as a function of the unused, reflected, and/or non-absorbed microwaves.

The drying can thus be controlled exactly. The wavelength of the microwaves, which results from the frequency, can be adapted to the required wavelength for drying the dialysis filter in that, for example, the frequency is adapted. The power can also be reduced with increasing drying. Algorithms can thus be used which monitor the moisture and/or the energy introduction via the feedback of the reflected, unused, and/or non-absorbed microwaves and adapt the wavelengths and/or the power to the changing moisture of the drying dialysis filter.

The object is achieved in a method of the type mentioned at the outset having one or more of the means and features disclosed herein and in particular in that the frequency and/or the power of the microwaves is varied during the drying. A device for drying dialysis filters having one or more of the features disclosed herein can preferably be used to carry out the method.

The frequency and/or the power may be adapted to the drying curve using this procedure. For example, a higher or increasing frequency of the microwaves is used with increasing drying to achieve better drying and avoid damage to other elements of the dialysis filter.

It is also advantageous that a power of the microwaves is varied during the drying. During the drying, the moisture in the dialysis filter decreases in the direction of gravity from top to bottom, i.e., the dialysis filter is then drier in an upper region than in a lower region. The microwaves primarily act on the water in the dialysis filter. When the water volume becomes smaller, a decreased power is also sufficient to effectuate the drying.

In one embodiment of the method, it is provided that a power of the microwaves is varied during the drying, while a frequency of the microwaves is kept constant.

In one embodiment of the method, it is provided that a frequency of the microwaves is varied during the drying, while a power of the microwaves is kept constant.

An air flow is preferably conducted through the dialysis filter during the drying. The moisture can be removed from the dialysis filter using the air flow. An air flow made up of dried and/or sterile air is particularly preferably used for this purpose.

Preferably, a moisture in the air flow is ascertained and the generation, in particular the frequency and/or the power, of the microwaves is controlled as a function of the ascertained moisture. The moisture in the air flow is an indirect measure of the moisture in the dialysis filter. The frequency and/or the power of the microwaves can be controlled as a function of the ascertained moisture and thus sufficient drying power can be introduced in a targeted manner into the dialysis filter as is currently required for drying.

In one embodiment of the method, it is provided that a moisture in the air flow and/or a degree of drying of the dialysis filter is ascertained from a difference between a moisture in an exhaust air flow and a moisture in a supply air flow. The frequency and/or the power of the microwaves can be changed as a function of the moisture and/or the degree of drying. The power of the microwaves can be reduced in this case with decreasing moisture and/or with increasing degree of drying.

Furthermore, it is possible to adapt the power and/or the frequency of the microwaves as a function of non-absorbed, unused, and/or reflected microwaves. The higher a power or amount of non-absorbed, unused, and/or reflected microwaves is, for example, the drier the dialysis filter can be.

Correspondingly, for example, the power of the microwaves, in particular of the microwave generating unit, may be reduced, in particular to avoid damage to the dialysis filter.

A microwave sensor of the device can be used for this purpose to detect microwaves which are unused and/or reflected in the drying chamber and/or non-absorbed microwaves.

This effectuates targeted and particularly gentle drying of the dialysis filter.

BRIEF DESCRIPTION OF THE DRAWINGS

The invention is described hereinafter on the basis of a preferred exemplary embodiment in conjunction with the drawings. In the figures:

FIG. 3 shows a dialysis filter and FIG. 4 shows a schematic illustration to explain a frequency shift.

DETAILED DESCRIPTION

Figure 1:
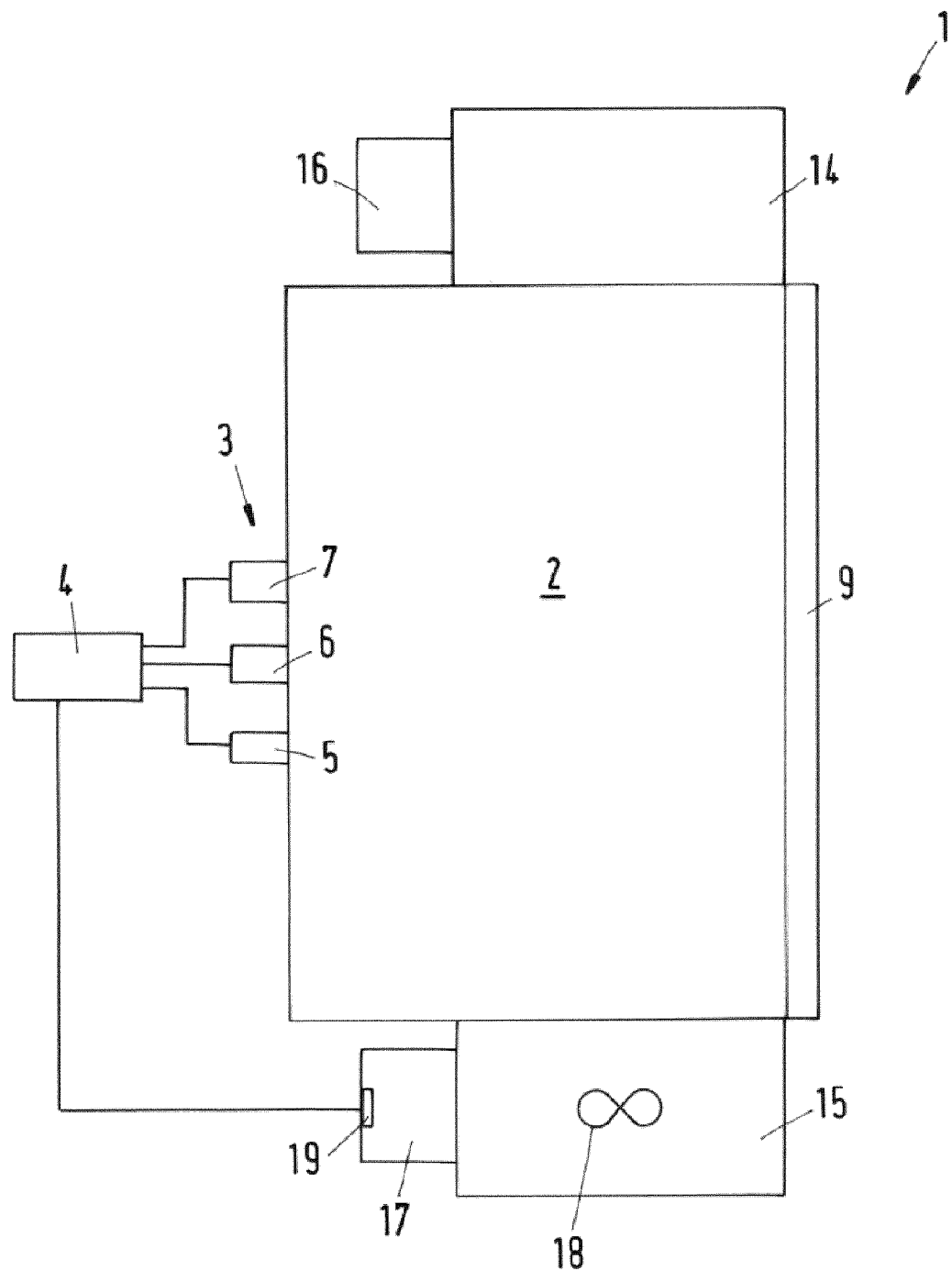
FIG. 1 shows a very schematic illustration of a device for drying dialysis filters in a side view, FIG. 2 schematically shows the device in a front view.

In the following description of various embodiments of the invention, elements corresponding in their function receive corresponding reference numerals even in the case of differing design or shaping.

Figure 5:
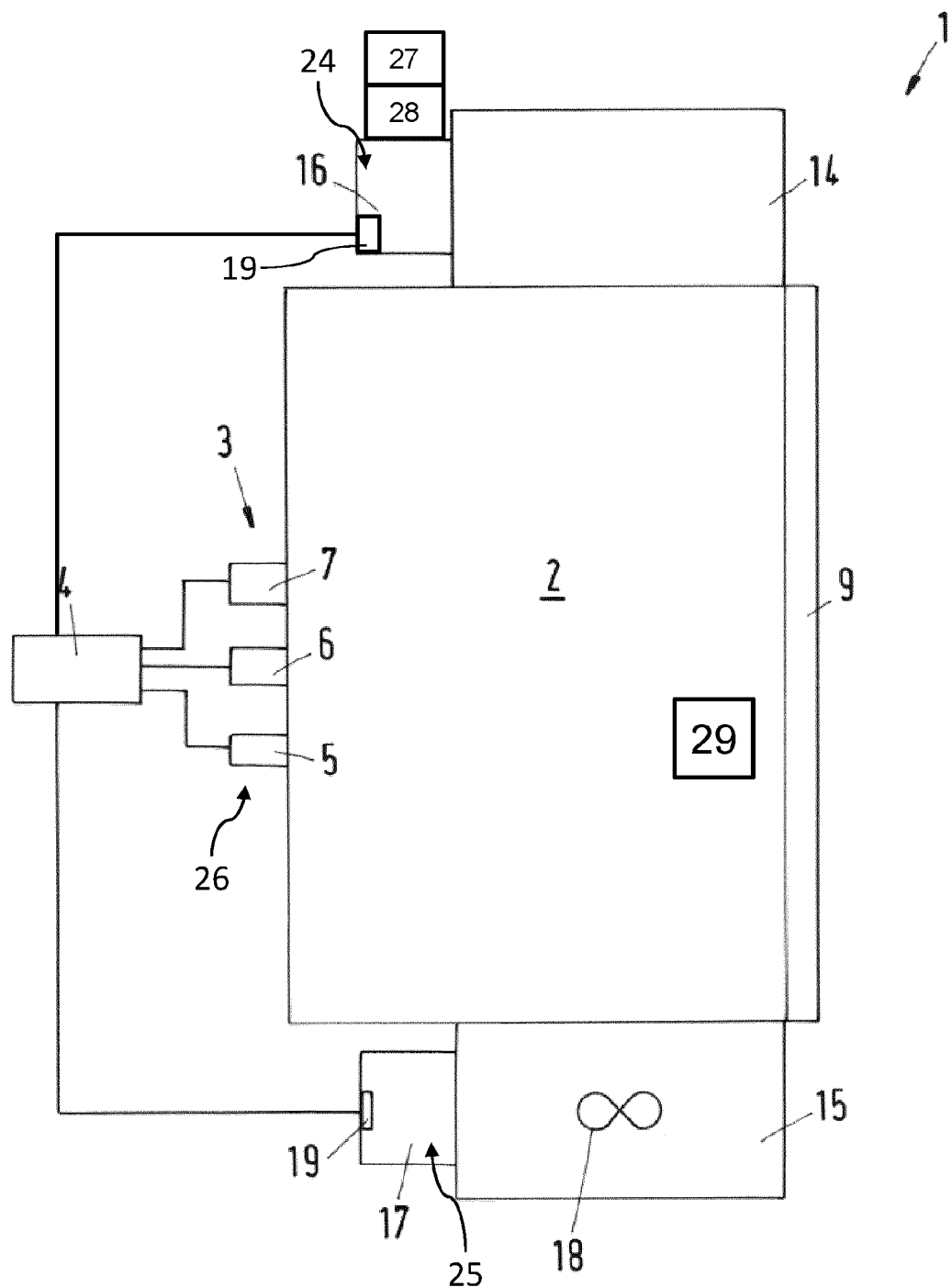
FIG. 5 shows a very schematic illustration of a further exemplary embodiment of a device for drying dialysis filters in a side view.

FIGS. 1 and 5 each show in very schematic form a device 1 for drying dialysis filters having a drying chamber 2 and a microwave generating unit 3. The microwave generating unit 3 emits microwaves into the drying chamber 2. A control unit 4 activates the microwave generating unit 3, wherein the control unit 4 can vary the frequency or the power or the frequency and the power of the microwave generating unit 3.

The microwave generating unit 3 has a microwave source 5, which is designed as semiconductor components or as an arrangement of semiconductor components and introduces microwaves via a schematically shown "antenna" 6 into the drying chamber. The microwave source 5 can also be arranged remotely from the drying chamber 2. In this case, it is expediently connected via a cable or another line to the antenna 6. The frequency of the microwave source 5 and thus the wavelength of the generated microwaves may be varied by the control unit 4. For example, the microwave generating unit 3 can be operated at a frequency of 2.4 GHz to 2.5 GHz.

In addition, the control unit 4 is capable of setting the power of the microwaves generated by the microwave source 5. In a dialysis filter 8 aligned vertically in the direction of gravity (which is shown in FIG. 3), drying generally takes place from top to bottom, i.e., there is a greater level of moisture in the lower region after a certain drying time than in the upper region. The microwaves primarily act on the water contained in the dialysis filter 8 as long as it is still present. It is possible due to the reduction of the power that the microwave generating unit 3 only still introduces as much power into the drying chamber 2 as the remaining water can absorb. The energy introduction in a dialysis filter may thus be deliberately controlled.

The drying chamber 2 is closed by a door 9. The door can be opened to introduce and remove the dialysis filter 8.

The dialysis filter 8 has two fitting pairs, namely having a first fitting "Luer" 10 and a second fitting "Luer" 11 in the first pair and a first fitting "Hansen" 12 and a second fitting "Hansen" 13 in the second pair.

Accordingly, the drying chamber 2 is provided with a connector arrangement, using which the fittings 10 to 13 can be connected. Specifically, this includes a supply air connector "Luer" 14, an exhaust air connector "Luer" 15, a supply air connector "Hansen" 16, and an exhaust air connector "Hansen" 17.

The Luer fittings 10, 11 are arranged in so-called blood caps, which are screwed onto the housing of the dialysis filter 8 or are connected in another way to the dialysis filter 8. In some cases, it is advantageous if the dialysis filter 8 is dried without these blood caps. In this case, not only the relatively small openings of the two Luer fittings 10, 11 are available for the air flow, but rather a relatively large cross section which practically corresponds to the cross section of the housing of the dialysis filter 8. The Luer connectors 14, 15 then have to be adapted accordingly.

An air flow generating unit 18, which has only been schematically shown, can generate an air flow through the dialysis filter 8 via one or two of the mentioned fitting pairs, preferably via the Luer fittings 10, 11, or the end faces of the dialysis filter 8 during drying without blood caps. A dialysis filter 8 arranged in the drying chamber 2 accordingly has flow through it from top to bottom. Moisture, which evaporates upon application of the microwaves from the microwave generating unit 3 to the dialysis filter 8, can be discharged from the dialysis filter 8 using the air flow.

A schematically shown moisture sensor 19 can ascertain the moisture in the discharged air. The moisture sensor 19 is connected to the control unit 4. The control unit 4 can then control the microwave generating unit 3 as a function of the moisture of the dialysis filter 8.

FIG. 2 shows the device 1 from the front. The door 9 is omitted for reasons of clarity. The microwave generating unit 3 is only shown here in the form of the antenna 6, which emits the microwaves into the drying chamber 2.

Otherwise, the same elements are provided with the same reference signs in FIG. 2 as in FIG. 1.

At the beginning of a drying process, the microwave generating unit generates microwaves at a frequency of 2.4 GHz, for example. These microwaves can be applied to the dialysis filter 8 on its entire length. The microwave source 5 can be operated here using a predefined or also changing power.

At the specified frequency of 2.4 GHz, the maximum energy introduction takes place at the beginning of the drying process. The drying can thus begin relatively quickly. With increasing drying, however, the optimum frequency shifts to, for example, approximately 2.5 GHz, which is symbolized by an arrow 21 in FIG. 4. The control unit 4 can take this into consideration and vary the frequency of the microwave generating unit 3 during the drying process.

In addition, it can generally be observed that the dialysis filter 8 dries faster in the upper region (in the direction of gravity) than in the lower region. Therefore, if the same microwave power or energy were introduced into the upper region over the entire drying process, overheating could occur here. The control unit 4 therefore reduces the microwave power to adapt it to the remaining moisture in the dialysis filter 8.

The control unit 4 can additionally also monitor the amount of energy reflected in the drying chamber 2 and thus precisely regulate the drying process. In other words, the wavelength of the microwaves is adjusted to the required wavelength for drying the dialysis filter 8 in that frequency and possibly power are adaptively adjusted. Therefore, algorithms can also or only be used which monitor the energy introduction via the feedback of the reflected power and adjust the wavelength or the frequency to the changing required frequency of the drying dialysis filter 8. In this way, the maximum possible energy for drying the dialysis filter 8 is always introduced. This results in a shorter drying time with low energy introduction into the overall system at the same time.

Since the energy is locally introduced in a targeted manner into the dialysis filter 8, the risk of an energy introduction into the housing material of the dialysis filter 8 and thus the destruction of housing parts is also prevented.

The frequency of the microwave generating unit 3 can be changed in steps, linearly, or according to another function. A linear change is a relatively simple option.

The air flow generating unit 18 can be supplied with sterilized air so that an introduction of germs into the dialysis filter 8 is prevented.

In addition, a shield 22, 23 (only shown in FIG. 2) can also be provided in the region of the connectors 14-17, which shields the fittings 10-13 from the microwaves.

The drying device 1 forms a module having a single drying chamber 2. A group of such modules will expediently be assembled and handled as a unit, so that multiple drying chambers are available simultaneously. For example, such a unit can have 4 modules adjacent to one another and multiple such units can be arranged one on top of another. The individual modules or units can be used in the form of a "building block", in which the required number of modules is assembled as needed.

FIG. 5 shows a device 1 for drying dialysis filters 8, which is very similar with respect to the device 1 shown in FIG. 1.

The device 1 according to FIG. 5 also has a drying chamber 2, into which a dialysis filter 8 can be introduced for drying. The device 1 also has a microwave generating unit 3, which emits microwaves into the drying chamber 2.

The microwave generating unit 3 of the device 1 shown in FIG. 5 has a variable frequency and a variable power. The microwave generating unit 3 of the device 1 shown in FIG. 5 is thus configured to emit microwaves having variable frequency and variable power onto a dialysis filter 8 arranged in the drying chamber 2.

If needed, the microwave generating unit 3 can vary the frequency of the microwaves at constant power, vary the power of the microwaves at constant frequency, or vary both the frequency and also the power of the microwaves independently of one another.

The microwave generating unit 3 of the device 1 shown in FIG. 5 is connected to a control unit 4. The control unit 4 is configured to vary the frequency and/or the power of the microwave generating unit 3 during a drying process.

The control unit 4 can activate the microwave generating unit 3 in such a way that the frequency is varied during the drying process, wherein the power is kept constant, the power is varied, wherein the frequency is kept constant, or both the frequency and also the power of the microwave generating unit 3 and thus of the microwaves generated by the microwave generating unit 3 are varied.

The control unit 4 of the device 1 shown in FIG. 5 is connected to a total of two moisture sensors 19. The frequency and/or the power of the microwave generating unit 3 can be varied as a function of moisture values, which are ascertainable using at least one of the two moisture sensors 19, or also as a function of a moisture value which is derivable from the moisture values which were ascertained using the two moisture sensors 19.

One of the two moisture sensors 19 is arranged in a supply air flow in the drying chamber 2, for example, in a supply air line 24 of the device 1. A second moisture sensor 19 is arranged in an exhaust air flow out of the drying chamber 2, for example, in an exhaust air line 25 of the device.

With the aid of the two moisture sensors 19, the moisture value of the air introduced into the drying chamber 2 and the air discharged from the drying chamber 2 can be determined and a difference value can be ascertained therefrom, which can be used as a manipulated variable or control variable for the control unit 4 to carry out the method for drying a dialysis filter 8 in an optimized manner.

The microwave generating unit 3 is also designed as a semiconductor assembly in the exemplary embodiment of the device 1 shown in FIG. 5. The microwave generating unit 3 comprises at least one microwave source 5, which is designed in the exemplary embodiment shown as a microwave generator 26. At least one magnetron and/or at least one semiconductor source can also be provided as a microwave source 5, for example.

The device 1 according to FIG. 5 furthermore has an antenna 6, which is only shown very schematically in FIG. 5. Both the microwave generator 26 and the antenna 6 are based on semiconductor technology.

Moreover, a microwave sensor 7 is provided adjacent to the antenna 6 in both devices 1. Reflected microwaves can be detected using this microwave sensor 7, which were not absorbed during the drying of the dialysis filter 8. The microwave sensor 7 is connected to the control unit 4 of the device 1. Its sensor signal can be used by the control unit 4 for the targeted control and/or regulation of the drying process.

According to FIG. 2, the microwave source 5, the antenna 6, and the microwave sensor 7 of the microwave generating unit 3 are arranged behind a cover 20. The cover 20 forms a part of an inner wall of the drying chamber 2.

The drying chamber 2 comprises a connector arrangement having connectors 14 to 17, which is connected to an air flow generating unit 18 of the device 1 according to FIG. 5. It is possible via the connectors 14 to 17 of the connector arrangement and the air flow generating unit 18 to have air flow through a dialysis filter 8 arranged in the drying chamber 2 during the drying process. Reference is made to the corresponding statements above in the text with respect to the functionality of the connectors of the supply air connector 14, the exhaust air connector 15, the supply air connector 16, and the exhaust air connector 17 of the connector arrangement.

The embodiment of the device 1 shown in FIG. 5 furthermore has an air dryer 27 and a sterilizing unit 28 for air sterilization. The air dryer 27 and the sterilizing unit 28 can be understood here as parts of the air flow generating unit 18. With the aid of the air dryer 27, it is possible to dry air which is conducted through the dialysis filter 8 during the drying of the dialysis filter 8. With the aid of the sterilizing unit 28, it is possible to sterilize the air, which is to be used for drying the dialysis filter 8, before introduction into the dialysis filter 8 located in the drying chamber 2.

To be able to detect the unused microwaves, thus those microwaves which are not absorbed by the dialysis filter 8 during the drying process, even more accurately, the device 1 according to FIG. 5 has a further microwave sensor 29 in addition to the microwave sensor 7. The microwave sensor 29 is also connected to the control unit 4 of the device 1 and is moreover arranged in the drying chamber 2. The microwave sensor 29 is configured to detect non-absorbed microwaves. Its sensor signal can be used by the control unit 4 for the targeted control and/or regulation of the drying process.

If it is possible to establish, for example, with the aid of the two microwave sensors 7 and 29, that the power and/or amount of microwaves which are reflected in the drying chamber 2, non-absorbed, or unused increases in the drying chamber 2, this can indicate that the moisture of the dialysis filter 8 decreases, it thus becomes drier. It can then be advantageous for the further drying process to reduce the power of the microwave generating unit 3 with the aid of the control unit 4 and/or to adjust the frequency of the microwaves, also to protect the dialysis filter 8 from overheating and/or damage.

If the detection of non-absorbed microwaves using only one microwave sensor is sufficiently accurate, one of the two microwave sensors 7 or 29 can also be omitted in the exemplary embodiment of the device 1 shown in FIG. 5.

In both devices 1 shown in the figures, conducting dried and/or sterile air through the dialysis filters 8 as needed is provided for drying the dialysis filters 8.

Both devices 1 can be configured to control the generation of the microwaves, in particular the frequency and/or the power of the microwaves, as a function of the moisture ascertained using the at least one moisture sensor 19.

In particular the device shown in FIG. 5 is furthermore configured to ascertain the moisture in the air flow and/or a degree of drying of the dialysis filter from a difference between a moisture in an exhaust air flow and a moisture in a supply air flow. The frequency and/or the power of the microwaves can then be varied as a function of the ascertained moisture and/or as a function of the degree of drying of the dialysis filter 8. For example, it is possible to reduce the power of the microwaves with decreasing moisture and with increasing degree of drying of the dialysis filter 8.

The charging of the charging chamber or drying chamber 2 can take place manually in both devices 1. However, it is also possible to use an automatic handling machine, for example, a six-axis robot.

LIST OF REFERENCE SIGNS 1 device
2 drying chamber
3 microwave generating unit
4 control unit
5 microwave source
6 antenna
7 microwave sensor
8 dialysis filter
9 door
10 first fitting "Luer"
11 second fitting "Luer"
12 first fitting "Hansen"
13 second fitting "Hansen"
14 supply air connector "Luer"
15 exhaust air connector "Luer"
16 supply air connector "Hansen"
17 exhaust air connector "Hansen"
18 air flow generating unit
19 moisture sensor
20 cover
21 arrow
22 shield
23 shield
24 supply air line
25 exhaust air line
26 microwave generator
27 air dryer
28 sterilizing unit
29 further microwave sensor

The invention claimed is:

1. A device (1) for drying dialysis filters (8), the device comprising:
   a drying chamber (2);
   a microwave generating unit (3), which emits microwaves into the drying chamber (2), and the microwave generating unit (3) has at least one of a variable frequency or a variable power;
   a control unit (4) to which the microwave generating unit (3) is connected, the control unit (4) is configured to at least one of a) vary at least one of the frequency or the power of the microwave generating unit (3) during a drying process or b) keep at least one of the frequency or the power of the microwave generating unit (3) constant during a drying process; and
   at least one moisture sensor (19) to which the controller (4) is connected, and the controller (4) varies the at least one of the frequency or the power of the microwave generating unit (3) as a function of a moisture value ascertained by the moisture sensor (19);
   wherein the at least one moisture sensor (19) is arranged at least one of in a supply air flow path or an exhaust air flow out of the drying chamber (2).

2. The device (1) as claimed in claim 1, wherein the microwave generating unit (3) is configured to keep the frequency constant at variable power.

3. The device (1) as claimed in claim 1, wherein the microwave generating unit (3) comprises a semiconductor assembly and includes at least one microwave source (5).

4. The device (1) as claimed in claim 1, wherein the drying chamber (2) has a connector arrangement (14-17), which is connected to an air flow generating unit (18).

5. The device (1) as claimed in claim 1, further comprising at least one of an air dryer (27) or a sterilizing unit (28) for air sterilization.

6. The device (1) as claimed in claim 1, further comprising at least one microwave sensor (7, 29) configured to detect non-absorbed microwaves that is connected to the control unit (4) of the microwave generating unit (3) and/or wherein at least one microwave sensor (29) is arranged in the drying chamber (2).

7. The device (1) as claimed in claim 1, wherein the microwave generating unit (3) is configured to keep the power constant at variable frequency.

8. The device (1) as claimed in claim 3, wherein the microwave source comprises at least one microwave generator (26) and at least one antenna (6).

9. The device (1) as claimed in claim 1, further comprising at least one microwave sensor (29) arranged in the drying chamber (2).

* * * * *